United States Patent
Hao et al.

(10) Patent No.: US 8,427,478 B2
(45) Date of Patent: Apr. 23, 2013

(54) DISPLAYING CONTINUALLY-INCOMING TIME SERIES THAT USES OVERWRITING OF ONE PORTION OF THE TIME SERIES DATA WHILE ANOTHER PORTION OF THE TIME SERIES DATA REMAINS UNSHIFTED

(75) Inventors: Ming C. Hao, Palo Alto, CA (US); Umeshwar Dayal, Palo Alto, CA (US); Daniel A. Keim, Steisslingen (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 895 days.

(21) Appl. No.: 12/290,252

(22) Filed: Oct. 28, 2008

(65) Prior Publication Data

US 2010/0103189 A1    Apr. 29, 2010

Related U.S. Application Data

(60) Provisional application No. 61/023,507, filed on Jan. 25, 2008.

(51) Int. Cl.
*G06T 15/00*    (2011.01)

(52) U.S. Cl.
USPC .............. 345/440; 381/81; 705/2; 725/40

(58) Field of Classification Search .............. 345/440; 709/245; 725/40; 381/81
See application file for complete search history.

(56) References Cited

U.S. PATENT DOCUMENTS

| | | | |
|---|---|---|---|
| 3,487,308 A | 12/1969 | Johnson | |
| 5,502,462 A | 3/1996 | Mical et al. | |
| 5,559,548 A * | 9/1996 | Davis et al. | 725/40 |
| 5,581,797 A | 12/1996 | Baker | |
| 5,608,904 A | 3/1997 | Chaudhuri et al. | |
| 5,623,590 A | 4/1997 | Becker et al. | |
| 5,623,598 A | 4/1997 | Voigt et al. | |
| 5,634,133 A | 5/1997 | Kelley | |
| 5,659,768 A | 8/1997 | Forbes et al. | |
| 5,694,591 A | 12/1997 | Du et al. | |
| 5,757,356 A | 5/1998 | Takeasaki et al. | |
| 5,801,688 A | 9/1998 | Mead et al. | |
| 5,878,206 A | 3/1999 | Chen et al. | |

(Continued)

FOREIGN PATENT DOCUMENTS

| | | |
|---|---|---|
| EP | 0778001 | 11/1996 |
| EP | 1388801 A3 | 11/2004 |
| WO | 2007012789 A1 | 2/2007 |

OTHER PUBLICATIONS http://processtrends.com/pg_charts_monthly_cycle_chart.htm; Horizontal Panel Chart—Monthly Cycle Chart, Feb. 25, 2008, pp. 1-3.*

(Continued)

*Primary Examiner* — Phu K Nguyen (57) ABSTRACT

Continually-incoming time series data is displayed in a visualization screen. In response to detecting that the visualization screen has become full with time series data, a first portion of the time series data is overwritten with additional incoming data such that the additional incoming data replaces the first portion of the time series data in the visualization screen. A second portion of the time series data is maintained unshifted even though the additional incoming data has been added to the visualization screen.

23 Claims, 6 Drawing Sheets

(3 of 6 Drawing Sheet(s) Filed in Color)

U.S. PATENT DOCUMENTS

| | | | |
|---|---|---|---|
| 5,903,891 A | 5/1999 | Chen et al. | |
| 5,924,103 A | 7/1999 | Ahmed et al. | |
| 5,929,863 A | 7/1999 | Tabei et al. | |
| 5,940,839 A | 8/1999 | Chen et al. | |
| 5,986,673 A | 11/1999 | Martz | |
| 5,999,193 A | 12/1999 | Conley, Jr. et al. | |
| 6,052,890 A | 4/2000 | Malagrino, Jr. et al. | |
| 6,144,379 A | 11/2000 | Bertram et al. | |
| 6,211,880 B1 | 4/2001 | Impink, Jr. | |
| 6,211,887 B1 | 4/2001 | Meier et al. | |
| 6,269,325 B1 | 7/2001 | Lee et al. | |
| 6,400,366 B1 | 6/2002 | Davies et al. | |
| 6,429,868 B1 | 8/2002 | Dehner, Jr. et al. | |
| 6,466,946 B1 | 10/2002 | Mishra et al. | |
| 6,466,948 B1 | 10/2002 | Levitsky et al. | |
| 6,502,091 B1 | 12/2002 | Chundi et al. | |
| 6,584,433 B1 | 6/2003 | Zhang et al. | |
| 6,590,577 B1 | 7/2003 | Yonts | |
| 6,603,477 B1 | 8/2003 | Tittle | |
| 6,658,358 B2 | 12/2003 | Hao et al. | |
| 6,684,206 B2 | 1/2004 | Chen et al. | |
| 6,727,926 B1 | 4/2004 | Utsuki et al. | |
| 6,748,481 B1 | 6/2004 | Parry et al. | |
| 6,934,578 B2 | 8/2005 | Ramseth | |
| 7,020,594 B1 | 3/2006 | Chacon | |
| 7,020,869 B2 | 3/2006 | Abari et al. | |
| 7,202,868 B2 | 4/2007 | Hao | |
| 7,221,474 B2 | 5/2007 | Hao et al. | |
| 7,313,533 B2 | 12/2007 | Chang et al. | |
| 7,567,250 B2 | 7/2009 | Hao et al. | |
| 7,714,876 B1 | 5/2010 | Hao | |
| 7,924,283 B1 | 4/2011 | Hao | |
| 2002/0118193 A1 | 8/2002 | Halstead, Jr. | |
| 2003/0065546 A1 | 4/2003 | Goruer et al. | |
| 2003/0065817 A1* | 4/2003 | Benchetrit et al. | 709/245 |
| 2003/0071815 A1 | 4/2003 | Hao et al. | |
| 2003/0128212 A1 | 7/2003 | Pitkow | |
| 2003/0144868 A1 | 7/2003 | MacIntyre et al. | |
| 2003/0200117 A1* | 10/2003 | Manetta et al. | 705/2 |
| 2003/0221005 A1 | 11/2003 | Betge-Brezetz et al. | |
| 2004/0051721 A1 | 3/2004 | Ramseth | |
| 2004/0054294 A1 | 3/2004 | Ramseth | |
| 2004/0054295 A1 | 3/2004 | Ramseth | |
| 2004/0201588 A1 | 10/2004 | Meanor | |
| 2004/0210540 A1 | 10/2004 | Israel et al. | |
| 2005/0066026 A1 | 3/2005 | Chen et al. | |
| 2005/0102428 A1* | 5/2005 | Heintze et al. | 709/245 |
| 2005/0119932 A1 | 6/2005 | Hao | |
| 2005/0180580 A1* | 8/2005 | Murabayashi et al. | 381/81 |
| 2005/0219262 A1 | 10/2005 | Hao et al. | |
| 2006/0095858 A1 | 5/2006 | Hao et al. | |
| 2007/0067488 A1 | 3/2007 | McIntire et al. | |
| 2007/0225986 A1 | 9/2007 | Bowe, Jr. et al. | |
| 2009/0033664 A1 | 2/2009 | Hao et al. | |

OTHER PUBLICATIONS

Deun et al., Multidimensional Scaling, Open and Distance Learning, Jan. 12, 2000 (pp. 1-16).

http://www.pavis.org/essay/multidimensional_scaling.html, 2001 Wojciech Basalaj, (pp. 1-30).

D. Keim et al Pixel Bar Charts: A New Technique for Visualization Large Multi-Attribute Data Sets with Aggregation:, HP Technical Report, Apr. 2001, pp. 1-10.

M. Ankerst et al "Towards an effective cooperation of the computer and the computer user for classification, Proc. 6th Int. Conf. on Knowledge Discovery and Data Mining," (KDD'2000), Aug. 20-23, 2000, Boston, MA, 2000, pp. 1-10.

M.C. Hao et al "Visual Mining of E-customer Behavior Using Pixel Bar Charts,", HP Technical Report, Jun. 20, 2001, pp. 1-7.

B. Shneiderman, "Tree Visualization with Treemaps: a 2-D Space-Filling Approach", pp. 1-10, Jun. 1991.

Daniel Keim et al "Designing Pixel-Orientated Visualization Techniques: Theory and Applications" IEEE Transactions on Visualization and Computer Graphics, vol. 6, No. 1, Jan.-Mar. 2000, pp. 59-78.

Jessica Lin, Eamonn Keogh, Stefano Lonardi, Jeffrey P. Lankford, Donna M. Nystrom; Visually Mining and Monitoring Massive Time Series; 2004; International Conference on Knowledge Discovery and Data Mining archive, Proceedings of the tenth ACM SIGKDD international conference on Knowledge discovery and data mining table of contents; pp. 460-469.

Eamonn Keogh, Harry Hochheiser, and Ben Shneiderman; An Augmented Visual Query Mechanism for Finding Patterns in Time Series Data; 2002; Lecture Notes in Computer Science, Proceedings of the 5th International Conference on Flexible Query Answering Systems; Springer-Verlag; vol. 252212002; pp. 240-250.

Chris Stolte et al., "Polaris: A System for Query, Analysis and Visualiztion of Multidimensional Relational Databases," IEEE Transactions on Visualization and ComputerGraphics, vol. 8, No. 1, pp. 1-14 (Jan.-Mar. 2002).

Daniel A. Keim et al., "VisDB: Database Exploration Using Multidimensional Visualization," IEEE Graphics and Applications, vol. 14, No. 5, pp. 40-49 (1994).

Matthew O. Ward, "XmdvTool: Integrating Multiple Methods for Visualizing Multivariate Data," Proc. Visualization, pp. 326-331 (Oct. 1994).

H. Hochheiser et al., "Dynamic Query Tools for Time Series Data Sets: Timebox Widgets for Interactive Exploration," Information Visualization, vol. 3, pp. 1-18 (2004.

P. Buono et al., "Technical Research Report, Interactive Pattern Search in Time Series," Institute for Systems Research, TR 2005-57, pp. 1-11 (2004.

J. Yang et al., "Visual Hierarchical Dimension Reduction for Exploration of High Dimensional Datasets," Joint Eurographics/IEEE TCVG Symposium on Visualization, pp. 19-28 (May 2003).

* cited by examiner

Column Counter

| Step | | 1 | 2 | 3 | 4 | 5 | 6 | 7 | 8 |
|---|---|---|---|---|---|---|---|---|---|
| 1 | data 7  | 0 | 1 | 2 | 3 | 4 | 5 | 6 | 7 |
| 2 | data 8  | 8 |   | 2 | 3 | 4 | 5 | 6 | 7 |
| 3 | data 9  | 8 | 9 |   | 3 | 4 | 5 | 6 | 7 |
| 4 | data 10 | 8 | 9 | 10 |   | 4 | 5 | 6 | 7 |
| 5 | data 11 | 8 | 9 | 10 | 11 |   | 5 | 6 | 7 |
| 6 | data 12 | 8 | 9 | 10 | 11 | 12 |   | 6 | 7 |
| 7 | data 13 | 8 | 9 | 10 | 11 | 12 | 13 |   | 7 |
| 8 | data 14 | 8 | 9 | 10 | 11 | 12 | 13 | 14 |   |
| 9 | data 15 | 8 | 9 | 10 | 11 | 12 | 13 | 14 | 15 |

DISPLAYING CONTINUALLY-INCOMING TIME SERIES THAT USES OVERWRITING OF ONE PORTION OF THE TIME SERIES DATA WHILE ANOTHER PORTION OF THE TIME SERIES DATA REMAINS UNSHIFTED

CROSS REFERENCE TO RELATED APPLICATIONS

This Application claims the benefit of U.S. Provisional Application Ser. No. 61/023,507, filed Jan. 25, 2008, titled "Displaying Continually Incoming Time Series Data That Uses Overwriting Of One Portion Of The Time Series Data While Another Portion Of The Time Series Data Remains Unshifted" which is hereby incorporated by reference herein as if reproduced in full below.

BACKGROUND

In many applications, data can be provided in a time series (data stream), in which data values are provided in a series of time points. Example applications in which data can be expressed in time series include financial applications (e.g., time series of asset prices, revenue, profit, currency exchange rates, etc.), network monitoring (e.g., metrics regarding performance of various aspects of a network, performance metrics of servers, performance metrics of routers, etc.), and so forth.

Customer and database administrators (or other users) often have to digest and visualize long multi-dimensional time series data, such as data reflecting workload management, network performance, computer performance, database loading error rates, and so forth. The time series data can be analyzed to discover patterns, trends, and anomalies.

Visualization screens for displaying continually-incoming time series have finite sizes. As a result, with some conventional techniques, as new incoming time series data is received when the visualization screen is already full, the existing time series data is shifted to the left to provide additional space in the visualization screen for the new incoming time series data. The shifting of data in the visualization screen is associated with at least two issues. First, if a large volume of data is being represented in the visualization screen, then having to shift all displayed data to accommodate the new incoming data is computationally quite expensive, since new positions of the displayed data have to be calculated to perform the shifting. Second, when there is a large amount of data being shifted, it is difficult for a user viewing the displayed data to keep track of patterns or portions of interest in the shifted data, which can make analyzing the data more difficult.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are described with respect to the following figures.

DETAILED DESCRIPTION

Figure 1:
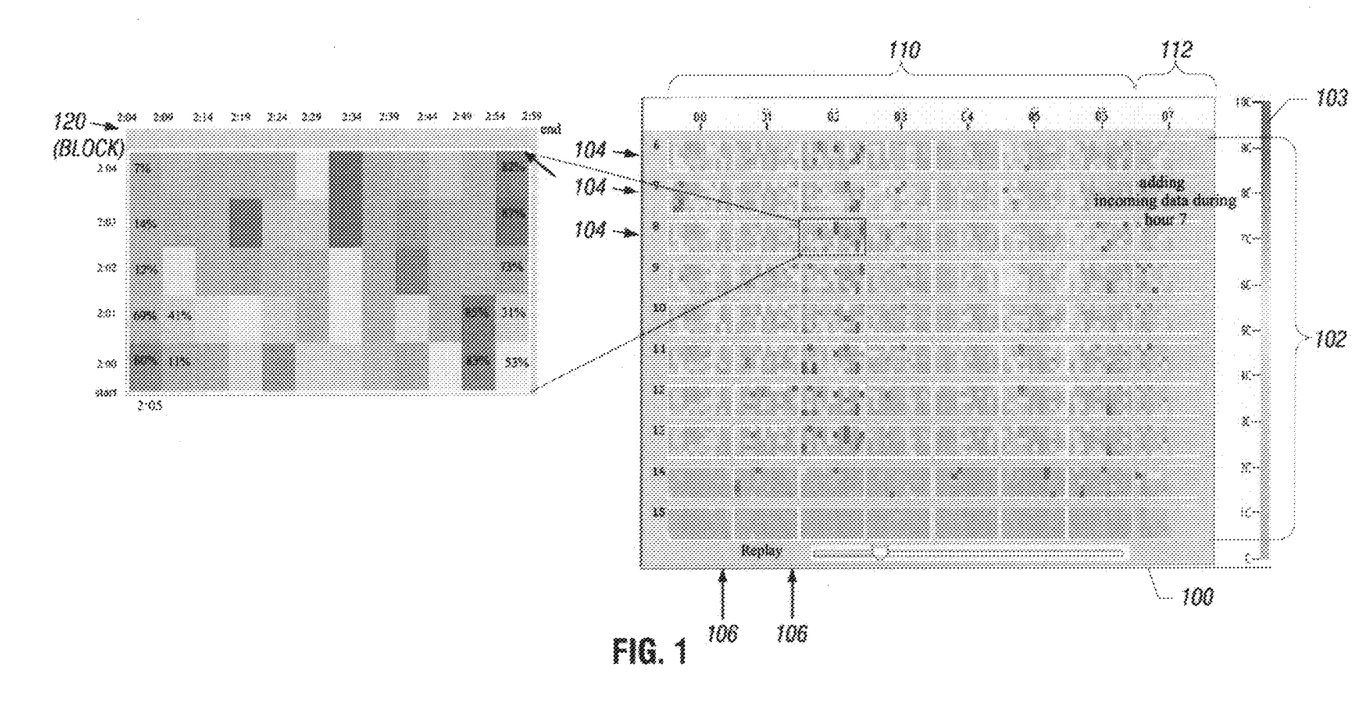
FIG. 1 illustrates a visualization screen having cell-based display regions for visualizing a continually-incoming time series of data, in accordance with an embodiment.

FIG. 1 illustrates a visualization screen 100 (which is displayable in a display device) for visualizing multiple time series of data. Each time series refers to a collection or set of data records over time. The visualization screen 100 can be in the form of a graphical user interface (GUI) screen, which can be a GUI window (such as a window provided by various operating systems, including WINDOWS® operating systems, Unix operating systems, Linux operating systems, etc.), or other image. The visualization screen 100 depicts a main array 102 of cells for multiple time series.

In the example of FIG. 1, ten rows 104 of time series data are provided in the main array 102, where each row 104 corresponds to a respective time series of data values. In the example of FIG. 1, the ten time series correspond to ten different central processing units (CPUs) 6-15 (note that the time series data for CPUs 0-5 are not displayed in the example of FIG. 1, although they could be in other examples). In other implementations, the different time series can represent other categorical attributes, where a categorical attribute can have values corresponding to different categories (e.g., different CPUs, different departments of a company, different employees, different geographic regions, etc.).

Each row 104 includes an arrangement of cells that represent values of corresponding data records of a measured attribute. For example, in the case where different rows correspond to different CPUs, the cells can represent a measured attribute such as CPU busy percentage (to indicate the percentage of time that the CPU is busy executing instructions). Each cell represents a corresponding data record. In the example of FIG. 1, eight time intervals are represented in eight corresponding columns 106, where each time interval corresponds to an hour in the example. Thus, in the example of FIG. 1, each row of cells represent data records over eight hourly time intervals for a particular CPU, starting at the $0^{th}$ hour and ending in the $7^{th}$ hour on a particular date. The intersection of a row and a column provides a block of cells, such as block 120 depicted in FIG. 1. The block 120 includes a sub-array of cells, ordered by time sub-intervals, in one example, and assigned to corresponding colors based on respective attribute values in data records. Thus, each of the rows 104 includes eight blocks 120 for the eight hourly intervals, in the example of FIG. 1.

In the block 120 depicted in FIG. 1, the color of each cell corresponds to a CPU busy percentage attribute value, with some example values (and corresponding colors) depicted in block 120 in FIG. 1. Also, each cell can represent the corresponding CPU busy percentage in a corresponding measurement interval (e.g., one minute). In the example of FIG. 1, the block 120 starts at 2:00 pm and ends at 2:59 pm (60 cells are in the block 120. The ordering of the cells, based on time, starts at the lower left corner and ends at the upper right corner. In other words, the cells are arranged from bottom to top and left to right. In other implementations, other ordering arrangements of cells can be used.

A scale 103 on the right side of the visualization screen 100 shows the mapping between values of a coloring attribute of the data records and corresponding colors. The cells are assigned colors according to the values of the coloring attribute in that time interval.

Although described in the context of the example visualization screen 100 of FIG. 1, other embodiments can be used with other color-based (or non-color-based) visualization screens that are capable of representing continually-incoming time series data.

A time-series data is considered to be continually incoming if additional new incoming data is repeatedly, intermittently, or continuously being received in succession. In one example, the continually-incoming time series data can be data measured by sensors, with the data from the sensors (which are considered one type of data sources) sent as a stream of data to a processing computer in which the visualization screen 100 of FIG. 1 can be displayed. In another example, the continually-incoming time series data is provided by other data sources (e.g., financial database, sales database, data entry terminals, etc.). In some embodiments, the data that is received by the processing computer can be real-time data that is received as the data sources transmit such data. The processing computer is said to receive real-time data if the processing computer performs some processing (such as visualization) of the data as the data is received by the processing computer.

In FIG. 1, the visualization screen 100 is initially not full. Initially, the visualization screen 100 has a first section 110 for displaying existing data (prior to further new incoming data being received and displayed in the visualization screen 100), and a second section 112 (on the right side of the visualization screen 100) that is initially empty and thus capable of displaying more data. In the example of FIG. 1, a row of time series data is displayed from left to right. In other words, as time series data is received, the display of such time series data in the visualization screen 100 starts on the left side of the visualization screen 100. As more incoming data is received, the rows grow towards the right of the visualization screen 100.

Thus, generally, continually-incoming time series data is said to be displayed from a first side of the visualization screen to a second side of the visualization screen. In a different example, instead of growing the display of the time series data from left to right, the time series data can be displayed from right to left, from top to bottom, from bottom to top, and so forth. Thus, the first side can be any of the sides of the visualization screen 100, while the second side can be any of the other sides of the visualization screen 100.

In FIG. 1, the second section 112, which was initially empty, has been filled with new incoming data. By inserting the new incoming data into the initially empty section 112, the positions of the existing data in the first section 110 of the visualization screen 100 are unaffected.

Once the new incoming data has been inserted into the second section 112 of the visualization screen 100, the visualization screen 100 becomes full. A visualization screen is "full" if additional data records cannot be inserted into the visualization screen without replacing some part of the visualization screen. Thus, any new incoming data has to replace a part of the displayed data. Conventionally, this has been performed by shifting all existing data to the left, with the oldest time series data being shifted off the visualization screen 100, and the new data inserted in the right side of the visualization screen 100. However, shifting of data to accommodate new data when the visualization screen is full is associated with at least two issues: (1) shifting of large volumes of data displayed in the visualization screen 100 is computationally expensive; and (2) shifting of large volumes of data makes viewing of the data in the visualization screen 100 more difficult, since the viewer has to identify what has changed and where some patterns that the viewer had previously identified are now positioned.

In accordance with some embodiments, new incoming data can be accommodated in a full visualization screen 100 by overwriting a first portion of the existing data without shifting a second portion of the existing data displayed in the visualization screen 100. "Overwriting" a portion of existing data refers to removing the portion of existing data from the visualization screen and replacing the portion with new data.

Although reference is made to overwriting oldest data in a visualization screen with new incoming data, it is noted that the opposite can be performed, where new data is overwritten with old data (such as in response to a selection to replay). In this scenario, the "additional" time series data that overwrites existing data in the visualization screen refers to prior data (or old data) that overwrites more recent data (or new data) currently being displayed in the visualization screen.

Figure 2A:
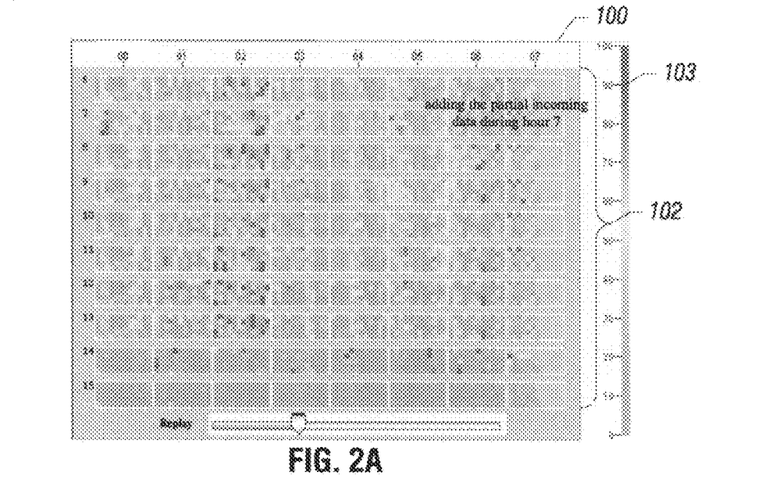
FIGS. 2A-2B illustrate visualization screens that are changing as additional time series data is received, in accordance with an embodiment.
Figure 2B:
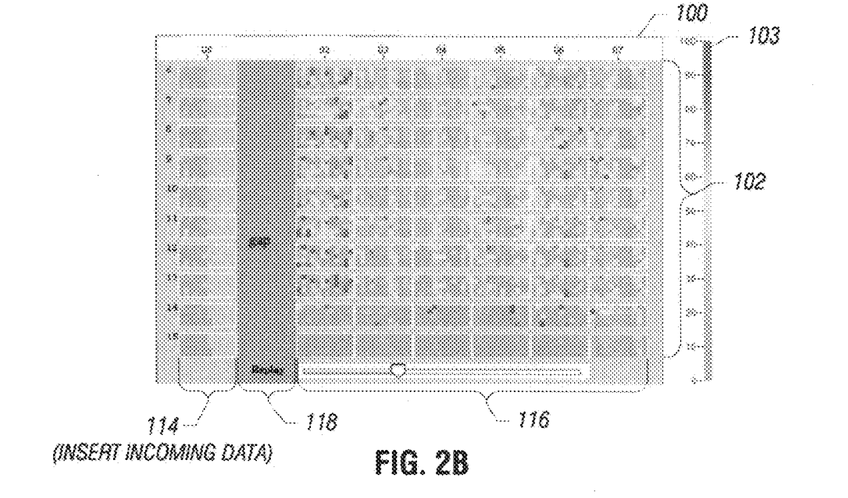

The visualization screen 100 of FIG. 1 is repeated in FIG. 2A. Moreover, as depicted in FIG. 2B, the new incoming data (for the $12^{th}$ hour in the example of FIG. 2B) is inserted into a left section 114 of the visualization screen 100 (which previously contained the column for the $0^{th}$ hourly interval as shown in FIG. 2A). The new incoming data effectively replaces or overwrites a first portion of the existing time series data, where the overwritten portion of the existing time series data is the oldest of the time series data, according to one embodiment. The second portion of the existing time series data remains unshifted in another section 116 of the visualization screen 100. The second portion of the existing time series data "remaining unshifted" in the section 116 means that the cells representing the data in the second section 116 have not moved within the visualization screen 100 with respect to prior positions of such cells (as depicted in FIG. 2A).

Thus, when comparing FIGS. 2A and 2B, a first change is that the oldest portion of the existing time series data has been replaced with the new incoming time series data in the section 114 (where the oldest time series data corresponding to the $0^{th}$ hourly time interval in FIG. 2A has been replaced). Another change is that a gap 118 has been inserted between the new incoming data in section 114 and the remaining portion of the existing time series data in section 116 of the visualization screen 100. The gap 118 is provided to separate the new data from the previous data to avoid confusion on the part of the viewer. In other words, the gap 118 is provided as an indication that new data has been inserted to replace a portion of the previous data. The gap 118 replaces previous time series data in the first hourly interval (which is the second oldest time series data).

By using the overwrite technique according to some embodiments, a much smaller part of existing time series data is changed in the visualization screen than compared with conventional techniques in which all existing time series data records have to be shifted to accommodate new incoming data when the visualization screen is full. Thus, the overwriting technique according to some embodiments is computationally more efficient, and also provides for more user-friendly technique of allowing a large percentage of the existing data to remain static such that the viewer does not lose track of patterns or data records that the viewer had previously identified as being interesting.

Figure 2C:
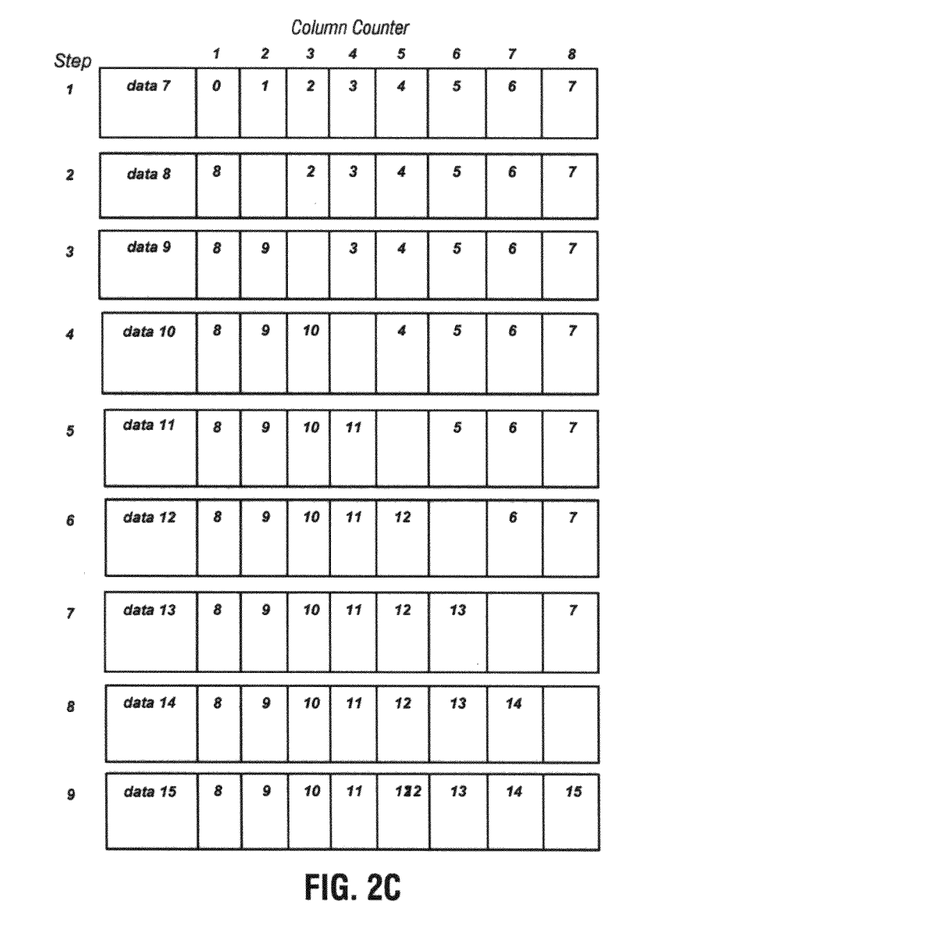
FIG. 2C illustrates an example of how continually-incoming time series data replaces existing data when a visualization screen becomes full.

FIG. 2C illustrates a simple example of displaying data using the overwriting technique according to some embodiments. In some implementations, a column counter is used to count which column of the visualization screen is the present location for inserting new incoming data. Thus, in the example of FIG. 2A, eight columns 106 are provided (one column for each hourly time interval). The column counter for the example of FIG. 2A can count from 1 to 8 to represent the 8 columns. In the initial state of FIG. 2A, the first seven columns were filled with existing data. Thus, in that initial state, the column counter has incremented to the value 8 to point to the $8^{th}$ column such that new incoming data is written to this $8^{th}$ column as identified by the column counter.

In the example of FIG. 2C, various steps are depicted, where each step corresponds to the receipt of new incoming data of a continually-incoming time series of data and the visualization of such newly-received incoming data. Step 1 corresponds to the receipt of first incoming data 7, step 2 corresponds to receipt of the next incoming data, and so forth. Note that previous steps preceding step 1 have already occurred to fill columns 1-7 of the visualization screen with data 0-6, respectively. At step 1, incoming data 7 is received. At this point, the column counter is pointing to the $8^{th}$ column, which corresponds to the state depicted in FIG. 2A. Thus, data 7 is written to the $8^{th}$ column.

At the end of step 1, after incoming data 7 has been inserted into column 8, as indicated by the column counter, incrementation of the column counter will cause the column counter to wrap around and reset to the value 1 to point to column 1. Also, at this state, all eight columns of the visualization screen have been filled with data (data 0 through data 7) such that the visualization screen is full. As a result, the next incoming data would have to replace some of the data in the visualization screen.

At step 2, incoming data 8 is received when the visualization screen is full. According to the overwriting technique of some embodiments, the incoming data 8 replaces the existing data in column 1 (data 0). The column counter is then incremented to point to column 2. In accordance with the overwriting technique, a gap is also written to this next value of the column counter (value 2), as depicted in step 2. Note that the data in columns 3-8 remain unchanged and unshifted in the visualization screen.

At step 3, incoming data 9 is received. At this point, the column counter points to column 2, such that the incoming data 9 overwrites the data in column 2. The column counter is incremented, and a gap is written to the column pointed to by the incremented column counter (in this case, column 3). In step 3, the existing data include data 8, 3, 4, 5, 6, and 7, which are not shifted due to insertion of data 9 and the following gap.

A similar process is repeated for steps 4, 5, 6, 7, and 8 to write incoming data 10, 11, 12, 13, and 14, to columns 3, 4, 5, 6, and 7, respectively, of the visualization screen. At the end of step 8, the column counter has been incremented such that it points to column 8.

At step 9, incoming data 15 is received, which is written to column 8, as pointed to by the column counter. Note, however, that a gap is not written since the incoming data has been written to the last column of the visualization screen.

At the end of step 9, the column counter has been incremented to wrap around and reset to point to column 1. The above process continues and repeats as new incoming data of the continually-incoming time series data is received.

Figure 3:
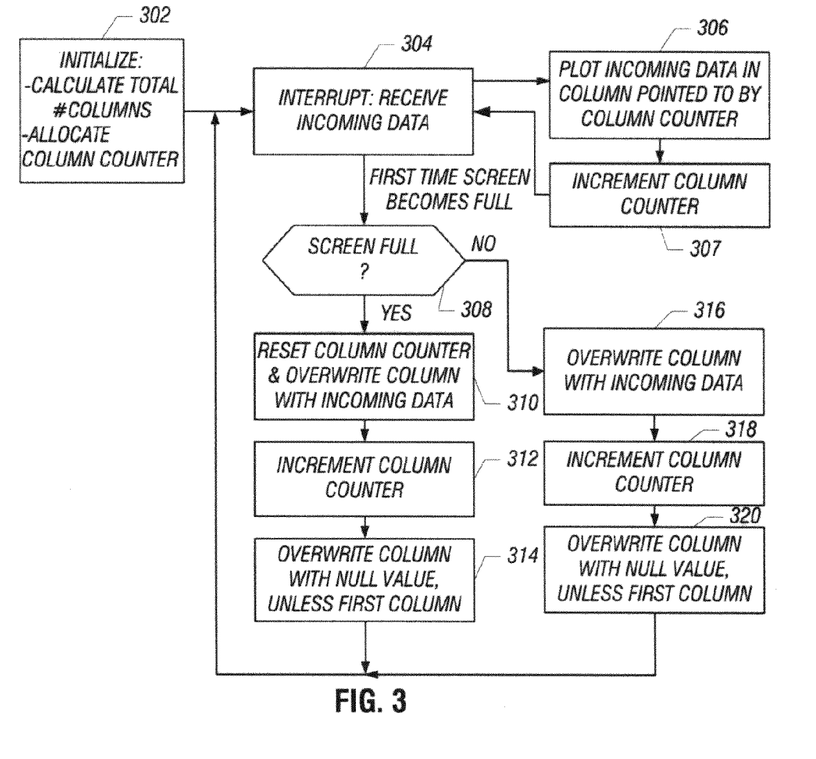
FIG. 3 is a flow diagram of a process of displaying continually-incoming time series data in accordance with an embodiment.

FIG. 3 is a flow diagram of a visualization process that employs an overwriting technique according to an embodiment. The visualization process can be performed by visualization software executable in a computer. First, an initialization procedure is performed (at 302), in which the total number of time intervals that are to be displayed in the visualization screen is calculated. The total number of time intervals determines the number of columns of the visualization screen. Also, the initialization procedure (302) allocates a column counter that points to a column in which incoming data is to be displayed. The column counter is initialized to the value 1 in some implementations.

In some embodiments, incoming data can be periodically received or intermittently received. An interrupt handler can be used to generate an interrupt periodically or alternatively, in response to new incoming data. In response to an interrupt from the interrupt handler, the incoming data is received (at 304) by the visualization software. If the visualization screen is not yet full, then new incoming data is plotted (at 306) in the column of the visualization screen pointed to by the column counter. With each plotting of new incoming data, the column counter is incremented (at 307), and the process returns to task 304. Tasks 304, 306, 307 are repeated so long as the visualization screen does not become full.

Next, upon the visualization screen first becoming full (in other words, the first time that the visualization screen becomes full), the process proceeds to task 308, where it is determined if the visualization screen is full. Note that the visualization screen is full the first time that the process reaches task 308. In response to the visualization screen being full (which would correspond to step 2 in the example of FIG. 2C), the column counter has been reset to the value 1, and the process overwrites (at 310) column 1 of the visualization screen with the new incoming data. The column counter is then incremented (at 312). Next, a gap (assigned a background color, such as a darker or lighter color, to distinguish the new incoming and the prior data in the visualization screen) is written (at 314) to the column pointed to by the incremented value of the column counter, which would be column 2. The process then returns to task 304 to wait for the next incoming data. In this implementation, the column containing the oldest data is overwritten with the new incoming data, and the next column containing the next oldest data is overwritten with values corresponding to the background color, such as a darker color or lighter color (to provide a gap).

If the task 308 determines that the visualization screen is not full after the first time the visualization screen has become full, then the process proceeds to overwrite (at 316) existing data in the column pointed to by the column counter with the new incoming data. This corresponds, for example, to any of steps 3 though 9 in the FIG. 2C example.

The column counter is then incremented (at 318) to point to the next column. Next, a gap is written (at 320) to the column pointed to by the incremented value of the column counter. Note, however, that task 320 is skipped if incrementing of the column counter at 318 causes the column counter to point to the first column.

The procedure then returns to task 304 for processing further new incoming data of a continually-incoming time series data.

The tasks of FIG. 3 may be provided in the context of information technology (IT) services offered by one organization to another organization. The IT services may be offered as part of an IT services contract, for example.

Figure 4A:
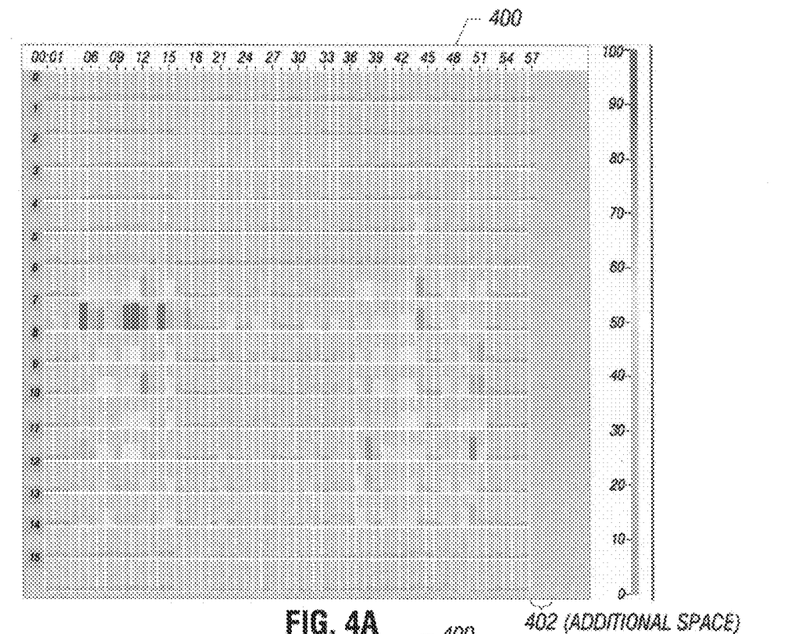
FIGS. 4A and 4B illustrate another example of a visualization screen for displaying continually-incoming time series data, according to another embodiment.

FIG. 4A illustrates a visualization screen 400 according to another example implementation. As with the visualization screen 100 of FIG. 2A, multiple time series are depicted in corresponding rows. However, in the example of FIG. 4A, instead of providing columns corresponding to hours, the columns may correspond to finer time intervals, such as minute time intervals. In FIG. 4A, note that 57 columns of data are present for rows corresponding to CPUs 0, 1, 2, and 3. However, the rows for CPUs 4-15 contain just 56 columns of data. Moreover, note that additional space 402 is present in the visualization screen 400 for adding additional time series data as they are received. Thus, the visualization screen 400 in FIG. 4A is not yet full.

Figure 4B:
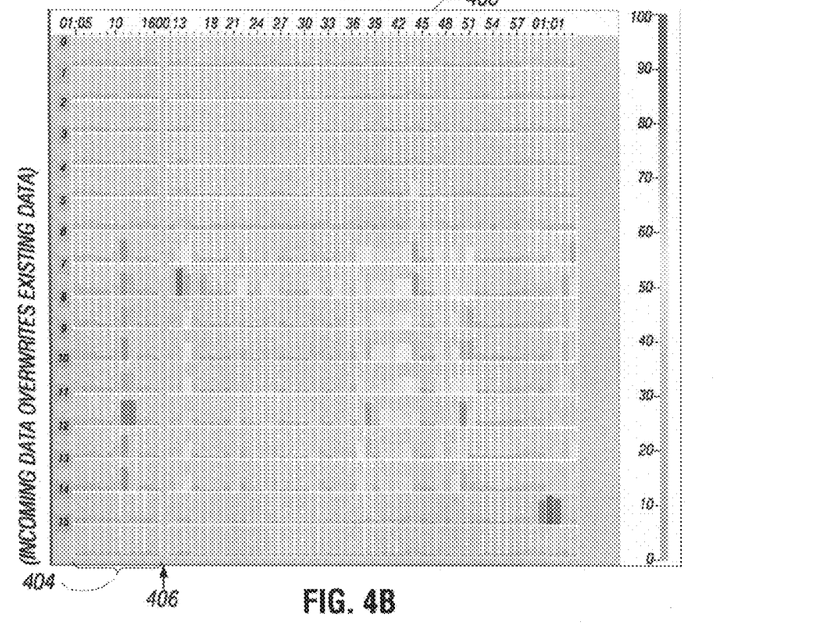

Assuming that the visualization screen has become full, which is assumed to be the initial state of the visualization screen 400 of FIG. 4B, then new incoming data overwrites existing data in a section 404 of the visualization screen 400 on the left part of the visualization screen 400, similar to what is performed in FIG. 1B. However, in FIG. 4B, multiple columns (rather than just one column as in FIG. 1B) of new incoming data have been added to section 404. In fact, eleven columns of data have been added to the section 404. Thus, according to the example of FIG. 4B, a group of multiple columns of data (rather than just one column of data) can overwrite existing data. A gap 406 is also inserted between the section 404 and the remaining portion of the existing data, with the remaining portion being unshifted as a result of adding the block of new incoming data.

Figure 5:
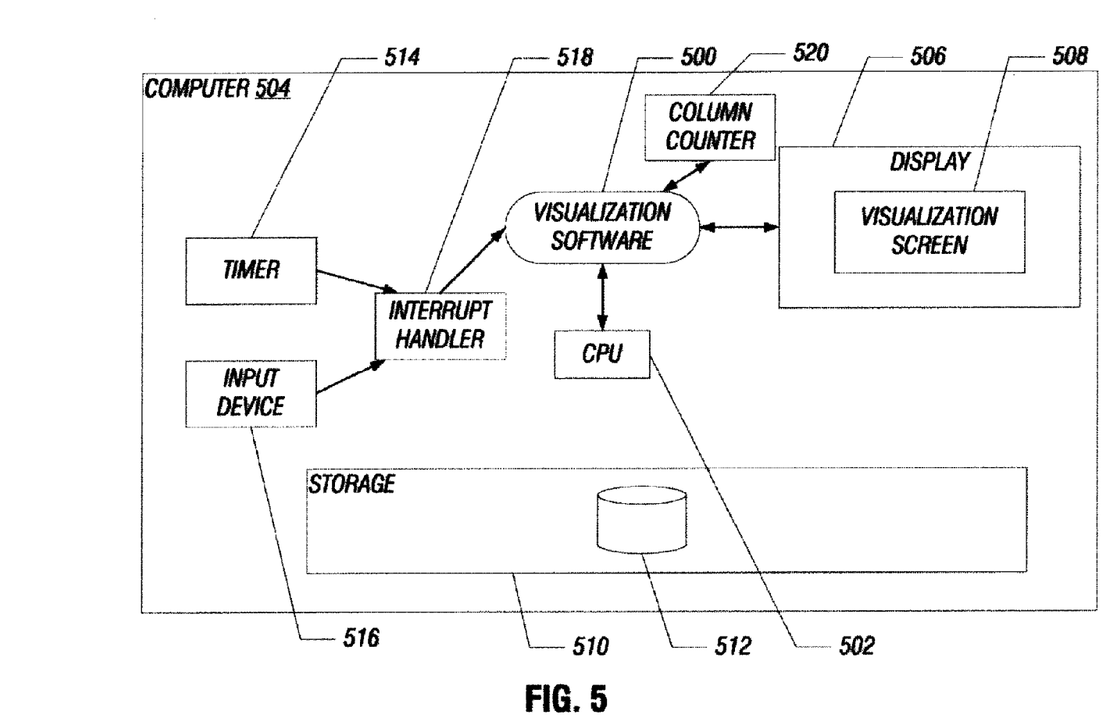
FIG. 5 is a block diagram of a computer in which software for performing visualization according to an embodiment is executable.

FIG. 5 depicts a computer 504 having visualization software 500 that can be used to perform various tasks discussed above, such as the process of FIG. 7. The visualization software 500 is executable on one or more central processing units (CPUs) 502 of the computer 504.

The computer 504 further includes an interrupt handler 518, which can also be software executable on the CPU(s) 502. The interrupt handler 518 receives either a timer interrupt 514 or an input device interrupt 516 to perform the tasks depicted in FIG. 3. As noted above in the discussion of task 304 in FIG. 3, a timer interrupt can be used to receive new incoming data periodically, or an input device interrupt can be used to cause reception of new incoming data as the new incoming data is received.

The computer 504 also includes a display device 506 that can display a visualization screen 508 (e.g., 100 in FIGS. 2A-2B or 400 in FIGS. 4A-4B) associated with the visualization software 500. The computer 504 further includes a storage 510 for storing a database 512, where the database 512 can contain the data associated with various time series for visualization in the display device 506.

Note that although the display device 506 and database 512 are depicted as being part of the computer 504, the display device 506 and the database 512 can actually be remotely located from the computer 504 in other implementations. For example, the visualization software 500 can be executable on a server computer, whereas the actual visualization can be performed at a remote client computer. Also, the database 512 can be stored in yet another database server that is located somewhere in a network.

Instructions of the visualization software 500 are loaded for execution on a processor (such as one or more CPUs 502). The processor includes microprocessors, microcontrollers, processor modules or subsystems (including one or more microprocessors or microcontrollers), or other control or computing devices. As used here, a "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
    displaying, by a computer, continually-incoming time series data in a visualization screen, wherein the displaying comprises:
        in response to detecting that the visualization screen has become full with cells representing first time series data, overwriting a first portion of the cells representing the first time series data displayed in the visualization screen with cells representing additional incoming time series data of the continually-incoming time series data such that the cells representing the additional incoming time series data replace the first portion of the cells representing the first time series data in the visualization screen, and
        maintaining a second portion of the cells representing the first time series data unshifted even though the cells representing the additional incoming time series data have been added to the visualization screen, wherein the cells in the second portion represent data records at respective time points of the first time series data.

2. The method of claim 1, further comprising inserting a gap between the cells representing the additional incoming time series data and the second portion of the cells representing the first time series data to provide a separation between the cells representing the additional incoming time series data and the second portion of the cells representing the first time series data in the visualization screen.

3. The method of claim 2, wherein inserting the gap comprises inserting the gap that is assigned a background color.

4. The method of claim 2, further comprising:
    receiving further additional incoming time series data of the continually-incoming time series data;
    overwriting, in the visualization screen, the gap with cells representing the further additional incoming time series data; and
    inserting another gap in the visualization screen after the cells representing the further additional incoming time series data, the another gap replacing a part of the second portion such that a reduced portion of the cells representing the first time series data remains displayed on the visualization screen, the reduced portion remaining unshifted in the visualization screen.

5. The method of claim 1, wherein displaying the continually-incoming time series data comprises displaying the continually-incoming time series data starting at a first side of the visualization screen and progressing to a second side of the visualization screen, wherein overwriting the first portion comprises overwriting the first portion at the first side of the visualization screen.

6. The method of claim 1, wherein displaying the continually-incoming time series data comprises displaying the continually-incoming time series data as a row containing color-based cells representing corresponding data records of the continually-incoming time series data.

7. The method of claim 6, further comprising assigning colors to the cells representing the corresponding data records of the continually-incoming time series data according to a coloring attribute of the corresponding data records of the continually-incoming time series data.

8. The method of claim 1, wherein displaying the continually-incoming time series data comprises displaying continually-incoming real-time data.

9. The method of claim 8, wherein displaying the real-time data comprises displaying the real-time data from data sources over a network.

10. The method of claim 1, wherein displaying the continually-incoming time series data further comprises:
displaying the continually-incoming time series data in plural columns of the visualization screen corresponding to plural time intervals.

11. The method of claim 10, wherein overwriting the first portion of the cells representing the first time series data comprises overwriting a group of the cells representing the first time series data that includes more than one of the plural columns.

12. The method of claim 10, wherein displaying the continually-incoming time series data further comprises displaying the continually-incoming time series data in a row in the visualization screen, where intersection of the row and a corresponding one of the columns provides a sub-array of cells representing data records of the time series data.

13. The method of claim 2, wherein overwriting the first portion of the cells representing the first time series data comprises overwriting an oldest portion of the cells representing the first time series data.

14. The method of claim 13, wherein inserting the gap in the visualization screen between the cells representing the additional incoming time series data and the second portion of the cells representing the first time series data comprises inserting the gap that overwrites a second oldest portion of the cells representing the first time series data in the visualization screen.

15. The method of claim 1, further comprising providing information technology services, wherein the displaying is part of the information technology services.

16. A method comprising:
receiving, by a computer, real-time data for display in a visualization screen;
determining, by the computer, whether the visualization screen is full;
in response to determining that the visualization screen is not full, inserting, by the computer, newly received real-time data after existing real-time data in the visualization screen;
in response to determining that the visualization screen is full, the computer
overwriting a first portion of the existing real-time data displayed in the visualization screen with the newly received real-time data, and
maintaining a second portion of the existing real-time data displayed in the visualization screen unshifted even though the newly received real-time data has been added to the visualization screen.

17. The method of claim 16, further comprising displaying data records of the real-time data as cells within the visualization screen.

18. The method of claim 17, further comprising assigning colors to the cells according to values of a coloring attribute of the data records.

19. An article comprising at least one non-transitory computer-readable storage medium containing instructions that when executed cause a computer to:
receive continually-incoming time series data; and
display the continually-incoming time series data in a visualization screen, wherein the displaying comprises:
in response to detecting that the visualization screen has become full with cells representing first time series data, overwrite a first portion of the cells representing the first time series data displayed in the visualization screen with cells representing additional incoming time series data of the continually-incoming time series data such that the cells representing the additional incoming time series data replace the first portion of the cells representing the first time series data in the visualization screen, and
maintain a second portion of the cells representing the first time series data unshifted even though the cells representing the additional incoming data have been added to the visualization screen, wherein the cells in the second portion represent data records at respective time points of the first time series data.

20. The article of claim 19, wherein the displaying further comprises:
inserting a gap in the visualization screen between the cells representing the additional incoming time series data and the second portion of the cells representing the first time series data to provide a separation between the cells representing the additional incoming time series data and the second portion of the cells representing the first time series data in the visualization screen.

21. The article of claim 19, wherein displaying the continually-incoming time series data comprises displaying the continually-incoming time series data starting at a first side of the visualization screen and progressing to a second side of the visualization screen, wherein overwriting the first portion comprises overwriting the first portion at the first side of the visualization screen.

22. The article of claim 19, wherein overwriting the first portion at the first side of the visualization screen comprises overwriting an oldest portion of the cells representing the first time series data.

23. The article of claim 19, wherein displaying the continually-incoming time series data in the visualization screen comprises displaying real-time time series data in the visualization screen.

* * * * *

UNITED STATES PATENT AND TRADEMARK OFFICE
CERTIFICATE OF CORRECTION

PATENT NO.          : 8,427,478 B2
APPLICATION NO.     : 12/290252
DATED               : April 23, 2013
INVENTOR(S)         : Ming C. Hao et al.

It is certified that error appears in the above-identified patent and that said Letters Patent is hereby corrected as shown below:

On the Title page, in Item (54), and in the Specification, in column 1, line 2, title, after "SERIES" insert -- DATA --.

Signed and Sealed this
Thirteenth Day of August, 2013

Teresa Stanek Rea
*Acting Director of the United States Patent and Trademark Office*